United States Patent
Yokota (10) Patent No.: US 7,787,144 B2
(45) Date of Patent: Aug. 31, 2010

(54) STORAGE MEDIUM STORING IMAGE PROCESSING PROGRAM, IMAGE PROCESSING APPARATUS AND IMAGE PROCESSING METHOD

(75) Inventor: Satoru Yokota, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1178 days.

(21) Appl. No.: 11/400,248

(22) Filed: Apr. 10, 2006

(65) Prior Publication Data

US 2006/0285130 A1    Dec. 21, 2006

(30) Foreign Application Priority Data

Jun. 21, 2005    (JP)    ............................. 2005-180755

(51) Int. Cl.
G06K 15/02    (2006.01)
(52) U.S. Cl. .................. 358/1.2; 358/1.9; 358/2.1; 358/528; 358/451; 382/258; 382/298; 382/299; 382/286
(58) Field of Classification Search .................. 358/1.2, 358/1.9, 2.1, 528, 451, 1.18, 538; 382/258, 382/298, 299, 286
See application file for complete search history.

(56) References Cited

U.S. PATENT DOCUMENTS 5,539,534 A * 7/1996 Hino et al. ................... 358/452
2001/0020950 A1 * 9/2001 Shimizu et al. ............. 345/611

FOREIGN PATENT DOCUMENTS

JP    A 04-362691    12/1992
JP    A 2001-34707    2/2001

OTHER PUBLICATIONS

Jan. 19, 2010 Office Action issued in Japanese patent application No. 2005-180755 (with translation).

* cited by examiner

Primary Examiner—Twyler L Haskins
Assistant Examiner—Kent Yip
(74) Attorney, Agent, or Firm—Oliff & Berridge, PLC (57) ABSTRACT

A storage medium readable by a computer, stores a program of instructions executable by the computer to perform a function for executing an image processing on an image defined by vector data containing a plurality of lines having different line widths, the function including calculating the line widths of the plurality of lines so as to maintain the number of types of line widths of the plurality of lines and a thinner-or-thicker relation among the line widths of the plurality of lines before executing the image processing, and setting the line widths calculated by the calculating step as line widths of the plurality of lines after the image processing.

12 Claims, 8 Drawing Sheets

| | 510 | 520 | 530 |
|---|---|---|---|
| PARAMETER | SET VALUE | | RANGE (VALUES ABLE TO BE TAKEN) |
| 501 — LINE WIDTH ADJUSTMENT MODE | DISCRIMINABILITY PREFERENCE | | DISCRIMINABILITY PREFERENCE/NO CHANGE |
| 502 — LINE WIDTH SCALE VALUE | 1.0 | | 1.0 - 10.0 |
| 503 — LINE WIDTH INCREMENT | 1 | | 1 - 10 |
| 504 — DATA TO BE ADJUSTED | ALL DATA | | ALL DATA/A3 OR OVER/A2 OR OVER/A1 OR OVER/A0 OR OVER/SPECIFIC DOT NUMBER OR OVER |

STORAGE MEDIUM STORING IMAGE PROCESSING PROGRAM, IMAGE PROCESSING APPARATUS AND IMAGE PROCESSING METHOD

BACKGROUND

1. Technical Field

The present invention relates to a storage medium storing image processing program, image processing apparatus, and image processing method for processing image data containing graphics and images, and particularly to a storage medium storing image processing program, image processing apparatus, and image processing method designed to be able to process image data without impairing the meaning of lines contained in the image data.

2. Related Art

In general, architectural and engineering designs or plans are drawn on paper or the like to communicate them to people, and enable manufacturers or building constructors to understand contents of the designs or plans and to produce products or build buildings according to the designs or plans. Recent improvement in technology has made the design drawings available electronically with the use of CAD (Computer Aided Design) technology or the like.

Preparation of drawings with the use of CAD technology has become rather common, and anyone is allowed to refer to or to print out any desired drawing at any time through a centralized management of CAD-prepared drawings with the use of a graphic management system or the like.

The CAD-prepared drawing can be viewed or printed out not only in its original size but also in an enlarged or reduced size. For example, a design drawing prepared in A1 size can be printed out in A3 size with a necessary processing to reduce the scale of the original design drawing to one fourth. In some cases, the drawing is displayed on a device after converting the resolution to match the display ability of the device.

Lines such as straight lines and curved lines are drawn in a design drawing such that they can be discriminated by differing the widths or patterns of the lines. These lines often have their own meanings. In architectural drawings, for example, architectural materials to be used and where it is placed in the whole architectural structure are differentiated by differing the width of the lines (hereafter to be referred to as the "line width").

Similarly, a document prepared in a common office environment sometimes gives meanings to lines contained therein. On the other hand, improvement in the performance of printers and printer drivers has made it possible to print a plurality of pages on a single sheet of paper ("N-up print") for the purpose of saving paper or protecting the nature and environment. If the N-up print is used to print the document, it is required to reduce the size of each page of the document so that the meanings of the lines may be lost.

This has required the user to refer to the original electronic file to check the line widths that the lines originally have.

Thus, there has conventionally been a problem that, due to the lack of understanding the importance of differentiating the meanings of lines by giving the lines different line widths, offhand reduction of the line widths was likely to be performed, resulting in that all the lines seemed to have an identical line width.

Figure 9A:
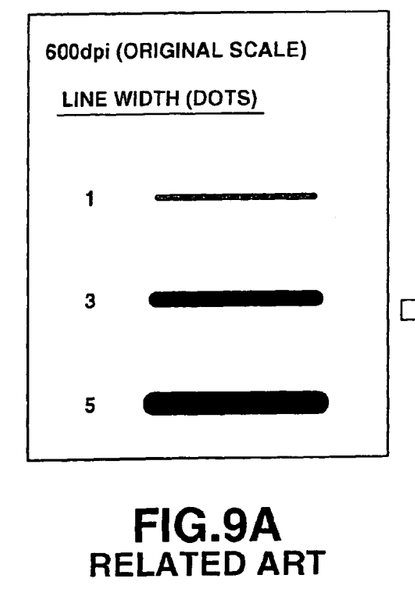
FIGS. 9A and 9B are diagrams showing an example in which the number of different line widths is reduced by the resolution conversion from high to low resolution according to a conventional technique.
Figure 9B:
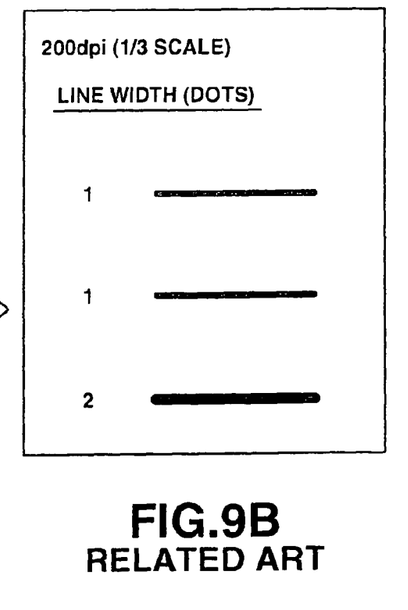

FIGS. 9A and 9B show an example in which the number of different line widths is reduced as the result of resolution conversion (conversion from high to low resolution) according to a conventional technique.

FIG. 9A shows a drawing drawn at 600 dpi (dot per inch), or at its original scale, in which three different lines are shown. A first line has a line width of 1 dot ("1"). A second line has a line width of 3 dots ("3"), and a third line has a line width of 5 dots ("5").

FIG. 9B shows the line widths that these three different lines take when the drawing resolution is reduced to ⅓, or 200 dpi.

When the resolution is reduced to ⅓, or 200 dpi, the line having the line width "1" as shown in FIG. 9A is represented as a line having the minimum line width, i.e., the line width "1" in FIG. 9B.

The line having the line width "3" as shown in FIG. 9A is represented as a line having the line width "1", that is one third of the line width "3" in FIG. 9B. The line having the line width "5" as shown in FIG. 9A is represented as a line having the line width "2" in FIG. 9B, that is obtained by dividing 5 by 3 and rounding up the value after the decimal point to the integer "2".

As seen the foregoing, although these three lines are represented as having three different line widths in the drawing before the resolution conversion as shown in FIG. 9A, the number of different line widths has been reduced to two in the drawing after the resolution conversion as shown in FIG. 9B, which results in that lines having the line widths "1" and "3" before the convention are treated as a line having the same line width.

If lines with different line widths are treated as lines having an identical line width, as in the example shown above, the meanings of these lines will be lost and thus the drawing reduced in size will become useless.

SUMMARY

According to an aspect of the present invention, a storage medium readable by a computer, stores a program of instructions executable by the computer to perform a function for executing an image processing on an image defined by vector data containing a plurality of lines having different line widths, the function including calculating the line widths of the plurality of lines so as to maintain the number of types of line widths of the plurality of lines and a thinner-or-thicker relation among the line widths of the plurality of lines before executing the image processing, and setting the line widths calculated by the calculating step as line widths of the plurality of lines after the image processing.

BRIEF DESCRIPTION OF THE DRAWINGS

Embodiment of the present invention will be described in detail based on the following figures, wherein:

FIGS. 7A-1, 7A-2, 7B-1 and 7B-2 are diagrams illustrating the line widths obtained by the adjustment method shown in FIG. 4;

DETAILED DESCRIPTION

Description will now be made of a storage medium storing an image processing program, image processing apparatus, and image processing method according embodiment of the present invention with reference to the accompanying drawings.

Figure 1:
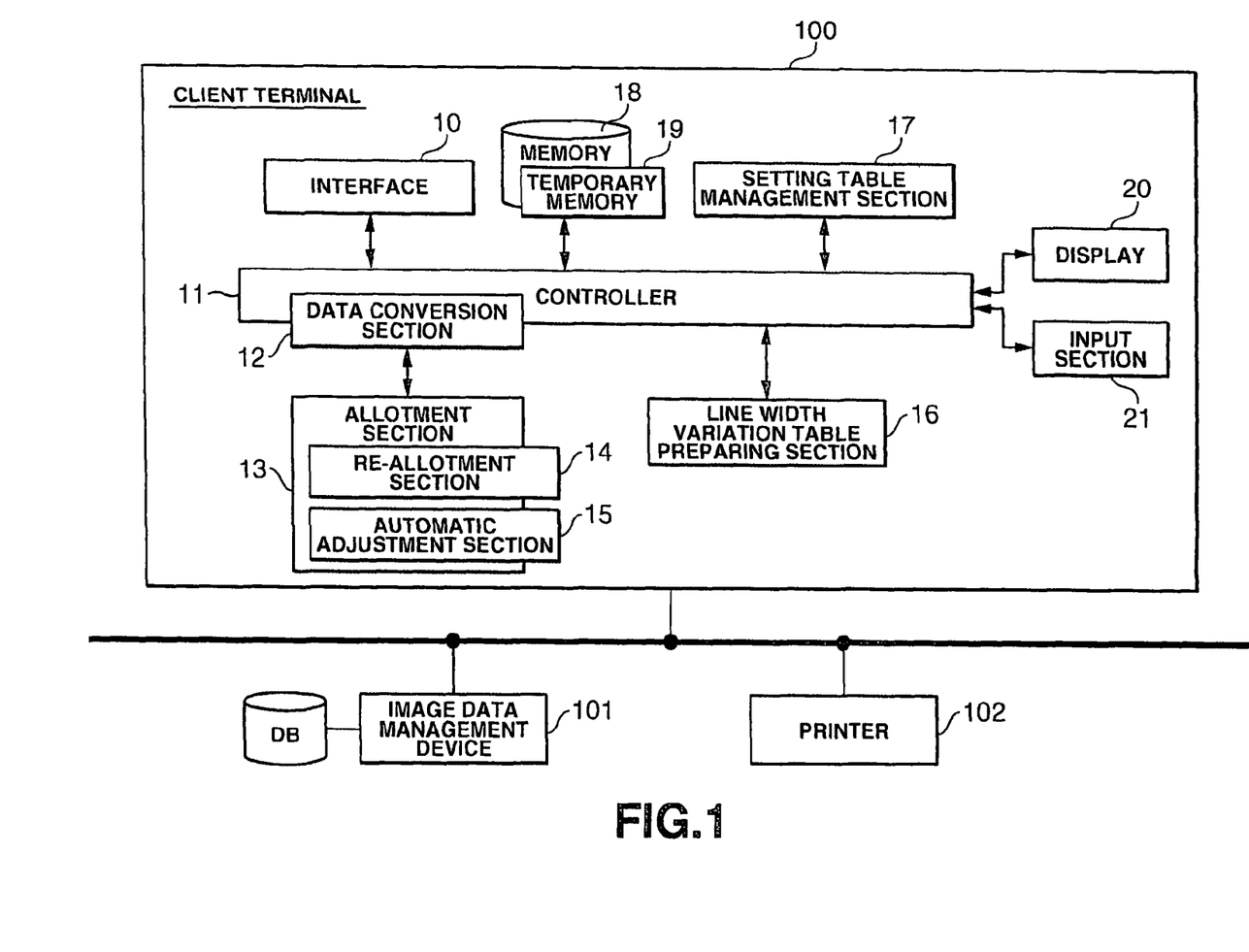
FIG. 1 is a block diagram illustrating a configuration of a module formed by applying an image processing program, image processing apparatus, and image processing method according to an embodiment of the present invention.

FIG. 1 is a system block diagram showing an image processing system configured by applying an image processing program, image processing apparatus, and image processing method of an embodiment of the present invention.

Referring to FIG. 1, the image processing system includes a client terminal 100, an image data management device 101, and a printer 102, and is designed to be able to provide optimum image data when displaying the image data on the client terminal 100 managed by the image data management device 101, or printing out the image data with the use of the printer 102.

The image data management device 101 manages image data of document and drawings produced by the client terminal 100 for management thereof by storing the data in a database.

The client terminal 100 is formed by a personal computer, a PDA (Personal Digital Assistance) or the like, and includes an interface 10, a controller 11, a data conversion section 12, an allotment section 13, a re-allotment section 14, an automatic adjustment section 15, a line width variation table preparing section 16, a setting table management section 17, a memory 18, a temporary memory 19, a display 20, and an input section 21.

The interface 10 is a communication interface which is used to communicate with a host apparatus such as the image data management device 101 or the printer 102 connected via a LAN (Local Area Network) cable or other communication circuit.

The controller 11 serves as a main control for the client terminal 100, and includes a data conversion section 12. The controller 11 generates a request for display of the image data of a document or drawing managed in the database of the management device 101, and causes the display 20 to display the image data retrieved in response to the display request.

When the user gives an instruction to change the display state of the image data displayed on the display 20 through the input section 21, the controller instructs the data conversion section 12 to convert the image data into a state that accords with the display state instructed by the user.

The data conversion section 12 converts the data size and resolution of image data based on the instruction to change the display state of the image data. Detailed contents of this conversion processing are illustrated in the flowcharts shown in FIGS. 2 to 4. These flowcharts illustrate the steps of processing that is designed to be able to convert image data while maintaining the discriminability of lines contained in the image data.

When the data size or resolution of the image data is converted by the data conversion section 12, the allotment section 13 allots to each line a line width indicating a breadth (thickness) of a line by using either the re-allotment method or the automatic adjustment method so that the discriminability of the lines contained in the image data to be converted can be maintained.

The re-allotment method is carried out by the re-allotment section 14 included in the allotment section 13, whereas the automatic adjustment method is carried out by the automatic adjustment section 15.

When image data is converted by the data conversion section 12, the re-allotment section 14 newly allots a line width to every one of the lines forming the image data. For example, four lines which are respectively allotted with the line widths "1", "2", "8", and "9" are re-allotted with new line widths, for example of "1", "2", "3", and "4".

When image data is converted by the data conversion section 12, the automatic adjustment section 15 automatically adjusts the line widths of all the lines forming the image data.

Unlike the re-allotment method carried out by the re-allotment section 14, the automatic adjustment method carried out by the automatic adjustment section 15 is able to adjust the line widths while preserving the line widths of the original image data. More specifically, when a line with a large line width is adjusted by the automatic adjustment section 15, the line is allotted with a large line width. In contrast, the re-allotment section 14 allots line widths to the lines of the image data while only maintaining the thinner-or-thicker relation among the line widths.

Setting information used in the re-allotment method and the automatic adjustment method is designated in a setting table managed by the setting table management section 17.

Determination of which of the re-allotment method and the automatic adjustment method is to be used may be made either by presetting the method to be used or by allowing the user to select.

Figure 8:
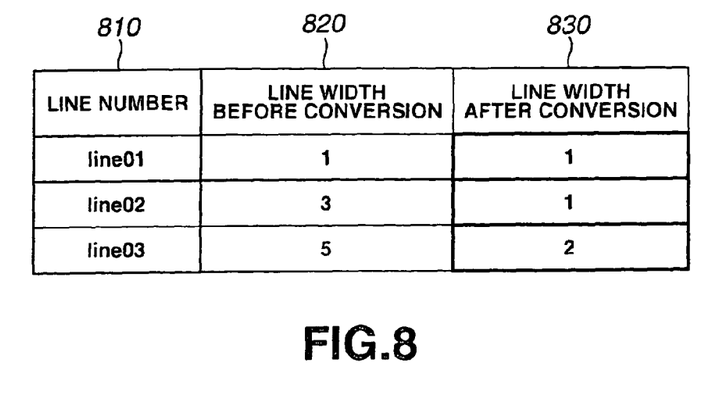
FIG. 8 is a diagram showing a line width variation table to be referred to for finding a difference in the line width before and after the conversion.

The line width variation table preparing section 16 generates a line width variation table which is used when the allotment section 13 allots line widths. The line width variation table shows how the line widths of lines contained in image data before data conversion are varied after the data conversion. FIG. 8 shows an example of the line width variation table.

Figure 5:
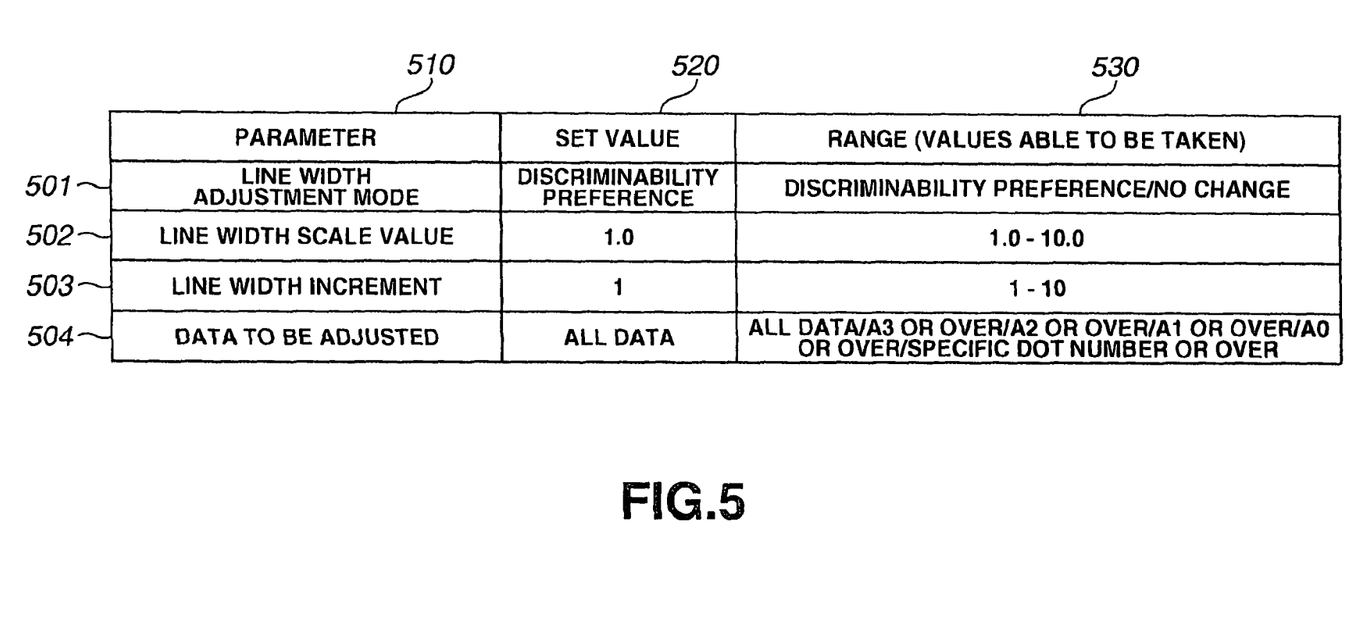
FIG. 5 is diagram showing a setting table that contains various setting information to be used for adjusting the line widths.

The setting table management section 17 manages a setting table which preliminarily holds various setting information that is referred to when the allotment section 13 allots line widths after the image data conversion. FIG. 5 shows an example of the setting table.

The memory 18 is formed by a ROM (Read Only Memory), a RAM (Random Access Memory) or the like, and stores a program and various parameter information for converting image data. The memory 18 is provided with a temporary memory 19 for storing temporary information.

The display 20 is a screen or the like, and the screen size thereof ranges from a relatively small display area like that of a typical mobile terminal to a relatively large display area like that of a desktop personal computer. The display 20 displays image data in response to a display instruction from the controller 11.

The input section 21 is formed by a keyboard, a pointing device or the like that is used by the user to instruct the display of image data managed in the database by the image data management device. The input section 21 is also used by the user to instruct to change the display state of the image data displayed on the display 20.

To change the display state means to enlarge or reduce the size of the image data currently displayed, or to change the resolution thereof. In particular, to change the resolution means to change the output resolution of the printer 102 printing out the image data, and the resolution depends on the performance of the printer 102.

The configuration as described above makes it possible for the image data to be displayed and printed out by the printer while maintaining the discriminability of the lines contained therein even if the user instructs to change the display state of the image data.

Figure 2:
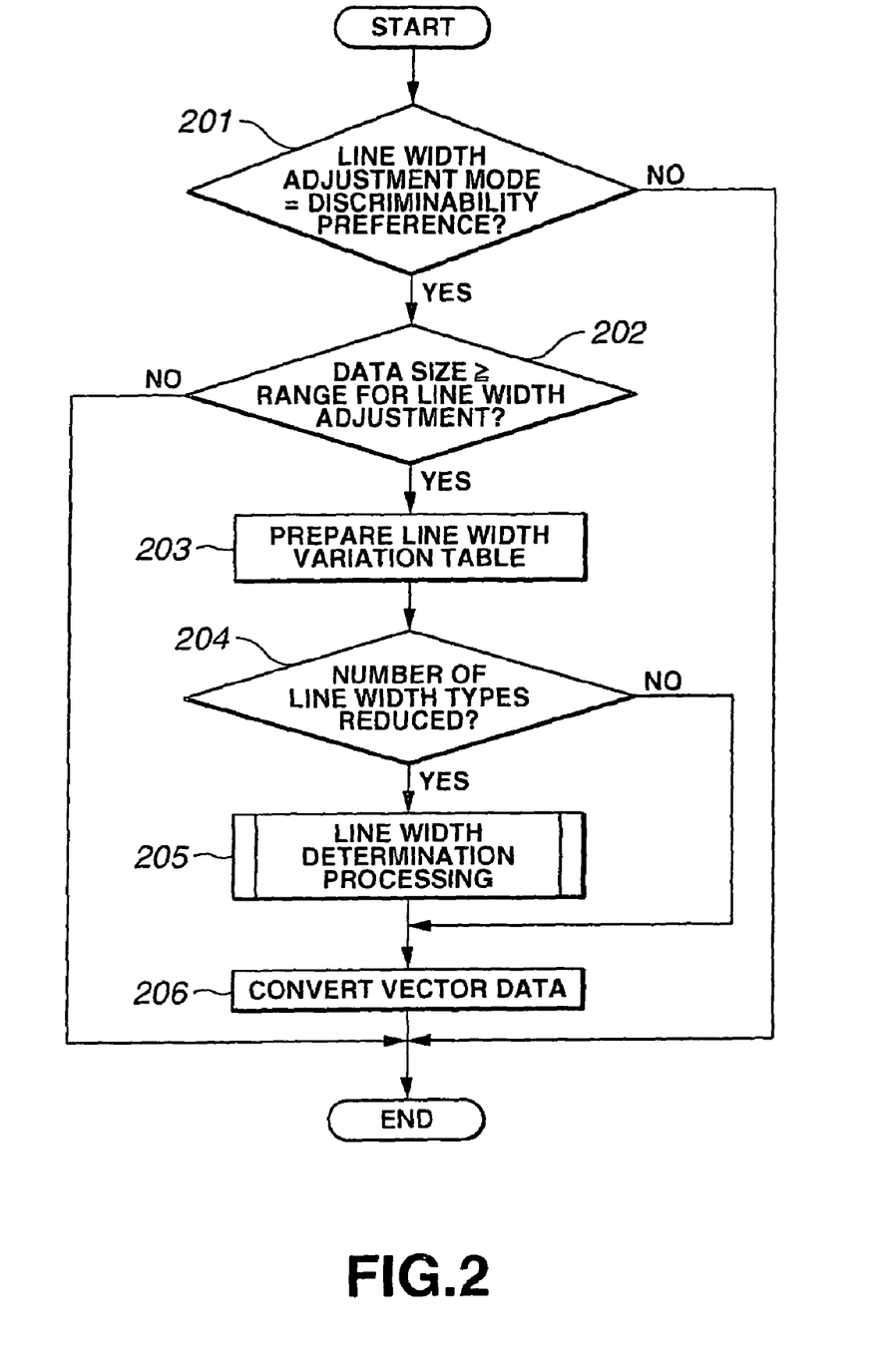
FIG. 2 is a flowchart illustrating processing steps performed by the image processing system according to the embodiment of the present invention.

FIG. 2 is a flowchart illustrating processing steps performed by the image processing system according to the present invention.

Referring to FIG. 2, the processing starts when the user gives an instruction to view or print out a drawing or image that is defined by vector data managed by a drawing management system or the like. It is determined, by referring to the setting table shown in FIG. 5, whether or not "discriminability preference" is set for the line width adjustment mode in which it is set whether or not the line widths of the lines drawn in the drawing or image are to be adjusted (step 201). If "discriminability preference" is set (YES in step 201), the processing is performed to enable the lines to be discriminated even if the line widths are changed when the image data is viewed or printed out.

Whereas, if "discriminability preference" is not set and "no change" is set instead (NO in step 201), the image data is viewed or printed out in a conventional manner. When the image data is printed out in a reduced size, for example, the line widths are changed according to the reduction ratio. When printed out with a reduced resolution, the line widths are changed in accordance with the rate of change of the resolution.

If it is determined that "discriminability preference" is set by the determination processing of step 201 (YES in step 201), it is subsequently determined whether or not the data size of the drawing or image to be viewed or printed out is within the range set for data to be adjusted in the setting table shown in FIG. 5 (step 202).

For example, if "all data" is set as the data to be adjusted, the line widths will be adjusted regardless of the data size of the drawing or image to be viewed or printed out. If "A2 or over" or the like is set, the line widths will not be adjusted unless the data size is A2 or over.

If it is determined that the data size is within the range of the data to be adjusted (YES in step 202), a line width variation table is generated to indicate how much the line widths differ between those in the data size viewed or printed out and those in the managed data size (step 203). An example of the line width variation table is shown in FIG. 8.

If it is determined that the data size is not within the range of the data to be adjusted (NO in step 202), the data is viewed or printed out in a conventional manner.

It is then determined, based on the line width variation table thus generated, whether the number of types of line widths has been changed or not, particularly whether the number of types of line widths has been decreased or not (step 204). If the number of types of line widths has been decreased (YES in step 204), line width determination processing is performed to determine the line widths (step 205). In contrast, if the number of types of line widths has not been decreased (NO in step 204), the data is viewed or printed out in a conventional manner, judging that the lines can be discriminated when the data is viewed or printed out.

Figure 3:
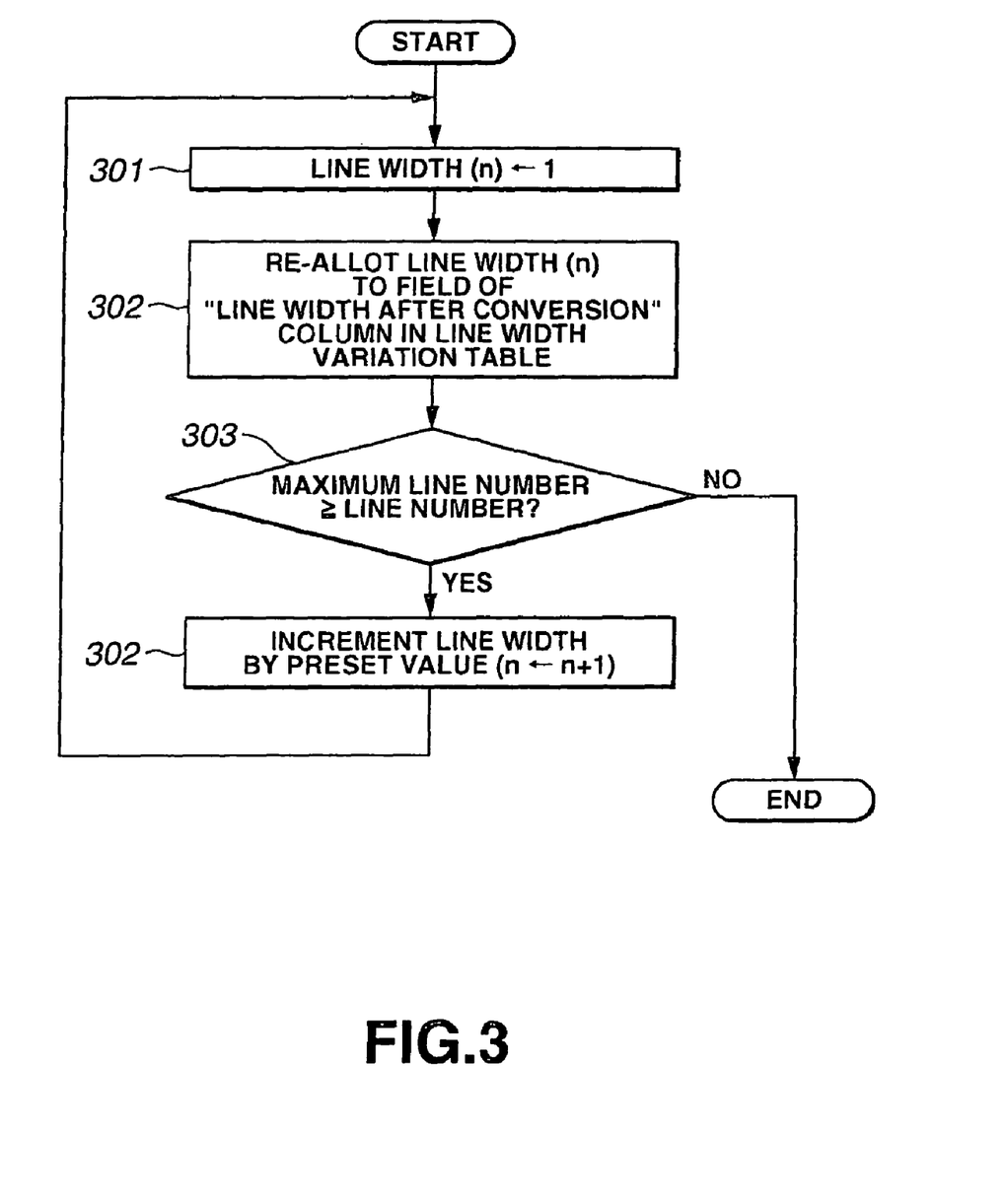
FIG. 3 is a flowchart illustrating in detail processing steps of the line width determination processing shown in FIG. 2.
Figure 4:
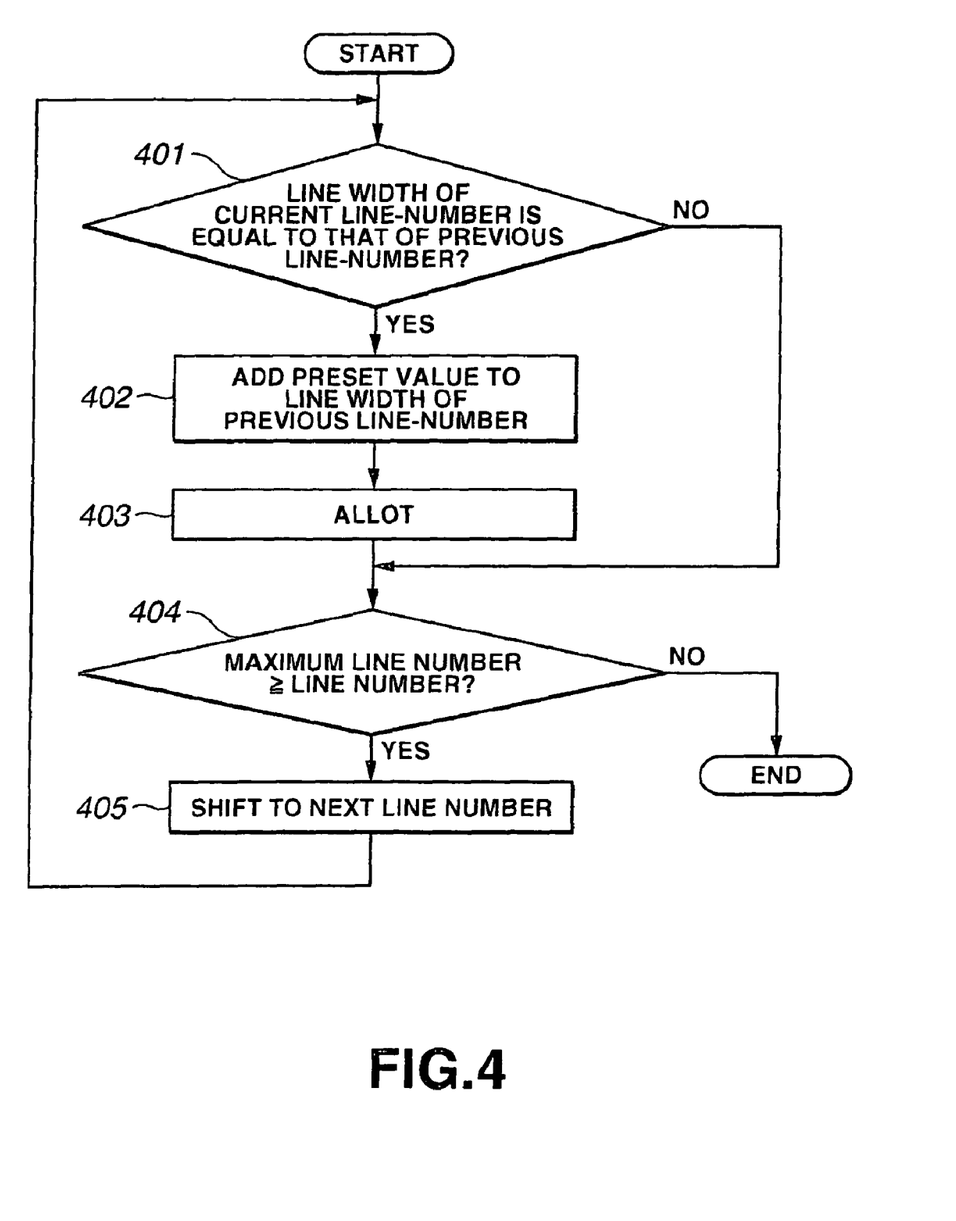
FIG. 4 is a flowchart illustrating in detail alternative processing steps of the line width determination processing shown in FIG. 2.

Detailed processing steps of the line width determination processing that is performed when the number of types of line widths has been decreased are shown in FIG. 3 and FIG. 4.

The vector data of the drawing or image to be viewed or printed out is converted to generate new vector data in which the line widths have been changed to the line widths determined by the line width determination processing (step 206).

In this manner, the image data can be viewed or printed out while ensuring the discriminability of the lines even if the number of types of line widths is reduced when the data is view or printed out.

FIG. 3 is a flowchart illustrating detailed processing steps of the line width determination processing shown in FIG. 2.

FIG. 3 shows the processing steps performed in the re-allotment method which allots again a line width to every one of the lines contained in a figure or image when the figure or image is viewed or printed out.

The processing is started when it is determined that the number of types of line widths has been decreased in FIG. 2, and a minimum line width is set as the line width of the line having the smallest line number among the line numbers that are allotted to the line widths in the line width variation table prepared in step 203 of FIG. 2 (step 301).

For example, if the minimum line width is set to the line width "1", the line width "1" is set for the line having the smallest line number.

The minimum line width thus set is allotted to the field for the smallest line number in the "line widths after conversion" column in the line width variation table shown in FIG. 8 (step 302). Subsequently, it is determined whether all the line numbers designated in the line width variation table have been re-allotted with line widths (step 303). If all the line numbers have been re-allotted with line widths (NO in step 303), the processing is terminated.

In contrast, if it is determined that not all the line numbers have been re-allotted with line widths (YES in step 303), the line width is incremented by a line width increment value that is set in the setting table shown in FIG. 5 (step 304), and the incremented line width is allotted to the line width corresponding to the second smallest line number (step 302).

This processing is repeated for all the line numbers designated in the line width variation table, whereby the lines of all the line numbers are newly allotted with line widths (the re-allotment method).

Although a minimum line width is employed as the reference line width in this flowchart, a maximum line width or any other line width of the lines to be processed by the line width determination processing may be used as the reference line width instead.

FIG. 4 is another flowchart illustrating detailed processing steps of the line width determination processing shown in FIG. 2.

FIG. 4 illustrates the processing steps performed in the automatic adjustment method to automatically adjust (subject to adjustment computation) the line widths of those lines, which originally have different line widths before conversion of the scaling value such as resolution or image size but take the same line width after the conversion.

The processing is started when it is determined in FIG. 2 that the number of types of line widths has been decreased. It is then determined whether or not the line width of the line with the second smallest line number in the line width variation table prepared in step 203 of FIG. 2 is equal to the line width of the line with the previous line number (the smallest line number) (step 401). If it is determined that the line width of the second smallest line number has the same line width as that of the line with the previous line number (YES in step

401), a preset set value is added to the line width of the line with the previous line number (step 402), and the line width thus obtained is allotted as the line width of the line with the second smallest line number (step 403).

After the allotment has been performed in this manner, or when the line width is not equal to that of the line with the previous line number (NO in step 401), it is then determined whether or not the line number of the line to compare the line width is equal to or larger than the maximum line number in the line width variation table (step 404). If it is larger than the maximum line number (NO in step 404), the processing is terminated, judging that the automatic adjustment has been done to all the line numbers in the width variation table.

If it is not larger than the maximum line number (YES in step 404), the line with the next line number in the line width variation table is processed (step 405). The processing steps from the step 401 described above are repeated for the line with this line number.

Through the processing as described above, the lines corresponding to all the line numbers can be allotted with new line widths, respectively, by the automatic adjustment.

FIG. 5 illustrates a setting table indicating various setting information used in the line width adjustment.

Referring to FIG. 5, the table includes columns for "parameter" 510, "set value" 520, and "range" 530. The "parameters" column 510 includes the parameter items of "line width adjustment mode" 501, "line width scale value" 502, "line width increment" 503, and "data to be adjusted" 504.

The "line width adjustment mode" 501 is a parameter for setting whether the line width adjustment is to be performed or not. The "line width scale value" 502 indicates a value for further finely adjusting a line width that has been adjusted, and is used mainly in the re-allotment method. The "line width increment" 503 indicates an increment value that is used when line widths are re-allotted as shown in the flowchart of FIG. 3. The "data to be adjusted" 504 indicates data of drawings or images to be adjusted.

The "set value" 520 indicates values that are set for the respective parameter items of the "parameter" column 510. For example, "discriminability preference" is indicated in the "set value" column 520 corresponding to the "line width adjustment mode" row 501 of the "parameter" column 510. This means that "discriminability preference" is set currently.

The "range" column 530 indicates values that the values of the respective parameter items in the "parameter" 516 are able to take (values that are set in the "set value" column 520). For example, it is indicated in the field for the "line width scale value" 502 that the line width scale value is able to take the range of values from 1.0 to 10.0, and that the value is a one-place decimal value. Similarly, it is indicated in the field for the "line width increment" 503 that the line width increment is able to take the range of values from 1 to 10, and that the value is an integer.

The image processing can be performed while maintaining the discriminability of line widths by executing the processing of the flowchart shown in FIG. 2 with the use of the values set in the setting table.

Figure 6A:
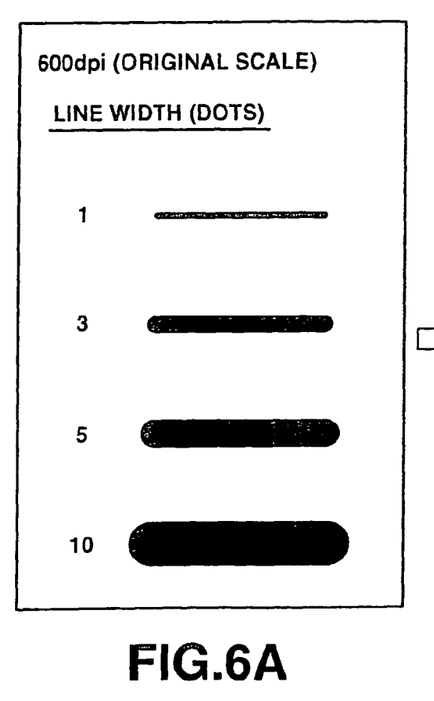
FIGS. 6A and 6B are diagrams illustrating the line widths obtained by the re-allotment method shown in FIG. 3.
Figure 6B:
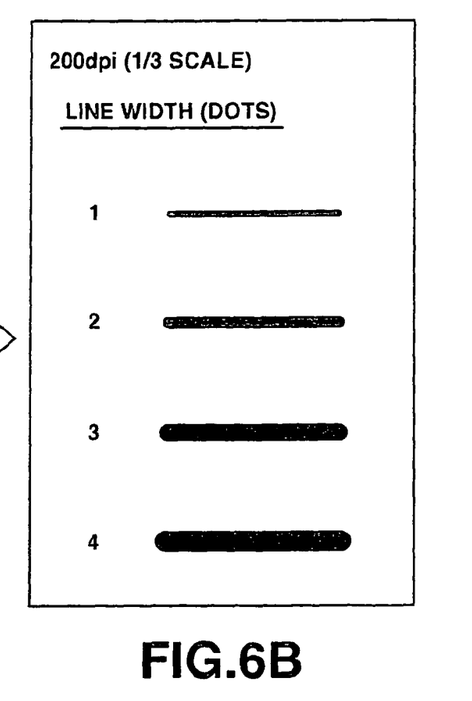

FIGS. 6A and 6B illustrate the line widths in the re-allotment method shown in FIG. 3.

FIG. 6A shows line widths of an original-scale drawing managed preliminarily, while FIG. 6B shows lines obtained after line widths are re-allotted to the lines in FIG. 6A by the re-allotment method.

FIG. 6A shows four lines respectively having four different line widths ("1", "3", "5", and "10") as printed out when the drawing is printed out at the resolution of 600 dpi.

FIG. 6B shows line widths of the lines which are printed out when the drawing is printed out at the resolution of 200 dpi corresponding to one third of the resolution 600 dpi in FIG. 6A.

Specifically, since the four original-scale lines shown in FIG. 6A have four different line widths, respectively, it is necessary that these four lines are allotted with four different line widths by the re-allotment method. The line width of the line having the smallest line width is defined as "1", and the line widths obtained by incrementing sequentially by the increment as shown in the setting table in FIG. 5 are allotted to the other lines.

More specifically, since the value of 1 is set as the increment in the "line width increment" field 503 in the setting table of FIG. 5, the smallest line width "1" and three different line widths obtained by sequentially incrementing by 1 are allotted to the four lines.

Consequently, the four different line widths "1", "2", "3", and "4" are respectively allotted to the four lines shown in FIG. 6A.

FIGS. 7A-1, 7A-2, 7B-1, 7B-2 illustrate the line widths in the automatic adjustment method shown in FIG. 4.

Figure 7A:
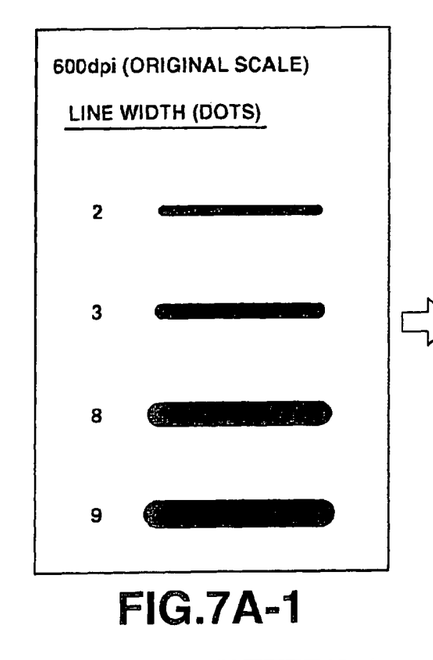
Figure 7A:
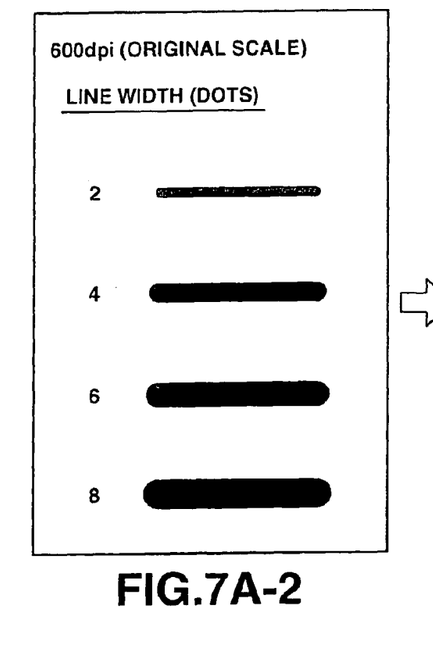
Figure 7B:
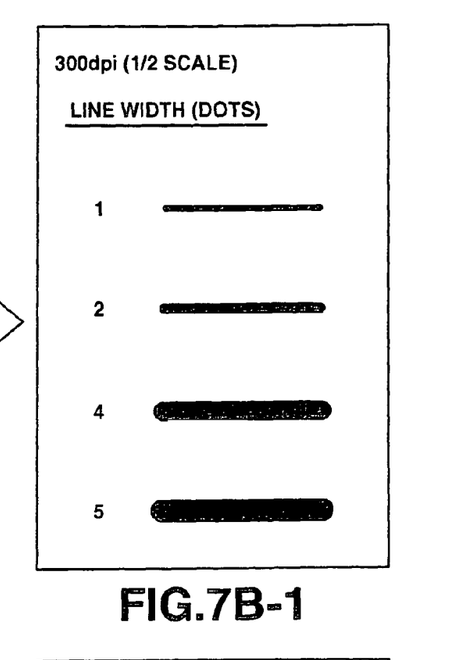
Figure 7B:
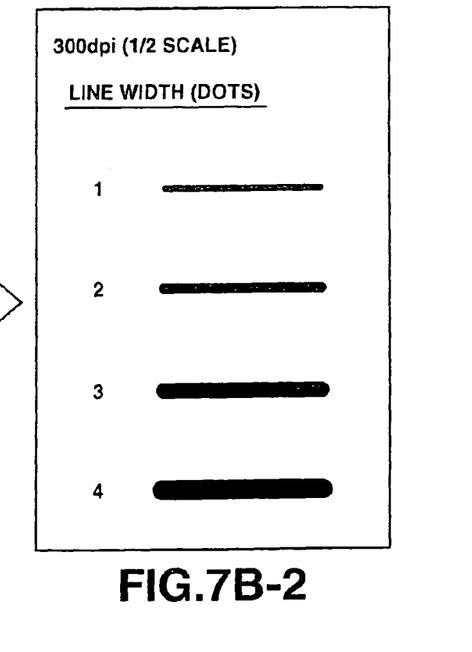

FIG. 7A-1 shows line widths of an original-scale drawing managed preliminarily, while FIG. 7B-1 shows lines widths obtained by adjusting the line widths of the lines in FIG. 6A by the adjustment method.

FIG. 7A-1 shows four lines respectively having four different line widths ("2", "3", "8", and "9") as printed out when the drawing is printed out at the resolution of 600 dpi. FIG. 7B-1 shows line widths of the lines which are printed out when the drawing is printed out at the resolution of 200 dpi.

The resolution of 300 dpi in FIG. 7B-1 corresponds to one half of the resolution of 600 dpi in FIG. 7A-1. Therefore, the line width "2" of the original line is also halved to the line width "1". This satisfies the minimum line width in the setting table shown in FIG. 5.

Although the line width "3" in FIG. 7A-1 also becomes "1" when divided by 2 (on the condition that the value after the decimal point is rounded off), the line with the line width "1" already exists as the result of the adjustment previously done. Therefore, the line width is adjusted to "2" by adding the increment of 1 to "1" according to the line width increment 503 in the setting table of FIG. 5.

The line width "8" of the line shown in FIG. 7A-1 is also adjusted to the line width "4" by dividing 8 by 2.

The line width "9" of the line shown in FIG. 7A-1 also becomes "4" when 9 is divided by 2 and the value after the decimal point is rounded off. Since the line with the line width "4" already exists, the line width is adjusted to "5" by adding the increment of 1 to "4" according to the line width increment 503 in the setting table of FIG. 5.

FIG. 7A-2 shows line widths when printed out at the resolution of 600 dpi, and there are shown four different line widths of "2", "4", "6", and "8". Since the resolution in FIG. 7B-2 is 300 dpi corresponding to a half of the resolution of 600 dpi in FIG. 7A-2, the line widths in FIG. 7A-2 are divided by 2, in a similar to the processing from FIG. 7A-1 to FIG. 7B-1 described above, to obtain "1", "2", "3", and "4", respectively In this case, the number of types of line widths is not reduced by the resolution conversion, and hence no line width adjustment is required.

FIG. 8 shows a line width variation table that is referred to check variation in the line widths before and after the conversion.

The table of FIG. 8 has a "line number" column 810, a "line width before conversion" column 820, and a "line width after conversion" column 830.

The line indicated by "line01" in the "line number" column 810 exhibits the line width of "1" in the "line width before conversion" column 820, and also exhibits the line width of "1" in the "line width after conversion" column 830. The line indicated by "line02" in the "line number" column 810 exhibits the line width of "3" in the "line width before conversion" column 820, and exhibits the line width of "1" in the "line width after conversion" column 830. Further, the line indicated by "line03" in the "line number" column 810 exhibits the line width of "5" in the "line width before conversion" column 820, and exhibits the line width of "2" in the "line width after conversion" column 830.

Thus, in the "line width after conversion" column 830, there are two lines exhibiting the line width of "1", namely the lines with the serial numbers of "line01" and "line02". In this case, it is judged that these lines cannot be discriminated, and the processing is implemented to preserve the discriminability of the lines by executing either the re-allotment method shown in FIG. 3 or the automatic adjustment method shown in FIG. 4.

This means that the determination whether the number of types of line widths has been changed (decreased) done in step 204 of FIG. 2 is equivalent to the determination whether the number of types of line widths has been changed between the "line width before conversion" column 820 and the "line width after conversion" column 830.

In the example shown here, there are three types of line widths in the "line width before conversion" column 820, whereas there are only two types in the "line width after conversion" column 830. Therefore, it is determined that the number of types of line widths has been reduced.

By performing the processing as described above, the image processing apparatus according to the present invention is able to ensure the discriminability of lines contained in image data of drawings or documents even if the image data is enlarged or reduced in size or the resolution thereof is converted.

This makes it possible to display the image data in an optimal state according to the display ability of the display device of a terminal viewing the image data, without impairing the meanings of the lines contained in the image data.

The processing illustrated in the flowcharts and described above may also be performed by an image processing program executable by a computer.

The present invention is applicable to image processing for viewing a design drawing or the like. The present invention is particularly useful in the image processing when the number of types of lines contained in image data of an original-size design drawing or the like is increased or reduced when the image data is enlarged or reduced in size, or the resolution thereof is converted.

As described above, according to an aspect of the present invention, a storage medium readable by a computer, stores a program of instructions executable by the computer to perform a function for executing an image processing on an image defined by vector data containing a plurality of lines having different line widths, the function comprising calculating the line widths of the plurality of lines so as to maintain the number of types of line widths of the plurality of lines and a thinner-or-thicker relation among the line widths of the plurality of lines before executing the image processing; and setting the line widths calculated by the calculating step as line widths of the plurality of lines after the image processing.

According to another aspect of the present invention, the image processing is a processing to reduce the image size or a processing to lower the resolution of the image in printing out the image.

According to still another aspect of the present invention, the function further comprises determining whether or not the number of types of line widths of the plurality of lines contained in the image is reduced by executing the image processing, wherein, when it is determined in the determining step that the number of types of line widths is reduced by executing the image processing, the calculating step and the setting step are executed.

According to even another aspect of the present invention, the calculating step calculates the line widths of the plurality of lines so as to maintain the number of types of lines widths of the plurality of lines before executing the image processing, by means of an adjustment processing which increases or reduces the line width of either one of the lines that become the same line width by the image processing.

According to yet another aspect of the present invention, the calculating step calculates the line widths of the plurality of lines so as to maintain the number of types of line width of the plurality of lines before executing the image processing, by means of an allotment processing which uses a line width of one of the plurality of lines processed by the image processing as a reference to perform allotment for line widths of other lines.

According to further aspect of the present invention, an image processing apparatus for performing image processing on an image defined by vector data containing a plurality of lines having different line widths, comprises a calculation unit that calculates the line widths of the plurality of lines so as to maintain the number of types of line widths of the plurality of lines and a thinner-or-thicker relation among the line widths of the plurality of lines before executing the image processing; and a setting unit that sets the line widths calculated by the calculation unit as the line widths of the plurality of lines after the image processing.

According to still further aspect of the present invention, an image processing method for performing image processing on an image defined by vector data containing a plurality of lines having different line widths, comprises calculating, by a calculation unit, the line widths of the plurality of lines so as to maintain the number of types of line widths of the plurality of lines and a thinner-or-thicker relation among the line widths of the plurality of lines before executing the image processing; and setting, by a setting unit, the line widths calculated by the calculation unit as the line widths of the plurality of lines after the image processing.

The forgoing description of the embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-180755 filed on Jun. 21, 2005 including specification, claims, drawings and abstract is incorporated herein by reference in its entirety.

What is claimed is:

1. A storage medium readable by a computer, the storage medium storing a program of instructions executable by the computer to perform a function for executing an image processing on an image defined by vector data containing a plurality of lines having different line widths, the function comprising:

calculating the line widths of the plurality of lines so as to maintain the number of types of line widths of the plurality of lines and a thinner-or-thicker relation among the line widths of the plurality of lines before executing the image processing; and     setting the line widths calculated by the calculating step as line widths of the plurality of lines after the image processing,     wherein the line widths of the plurality of lines are calculated so as to maintain the number of types of line widths of the plurality of lines before executing the image processing, by increasing or reducing the line width of either one of the lines that will become the same line width by the image processing.

2. The storage medium according to claim 1, wherein the image processing is a processing to reduce the image size or a processing to lower the resolution of the image in printing out the image.

3. The storage medium according to claim 1, the function further comprising determining whether or not the number of types of line widths of the plurality of lines contained in the image is reduced by executing the image processing,     wherein, when it is determined that the number of types of line widths is reduced by executing the image processing, the calculating and the setting are executed.

4. The storage medium according to claim 1, wherein the line widths of the plurality of lines are also calculated so as to maintain the line widths of the plurality of lines before executing the image processing, by means of an allotment processing which uses a line width of one of the plurality of lines processed by the image processing as a reference to perform allotment for line widths of other lines.

5. An image processing apparatus for performing image processing on an image defined by vector data containing a plurality of lines having different line widths, the apparatus comprising:

a calculation unit that calculates the line widths of the plurality of lines so as to maintain the number of types of line widths of the plurality of lines and a thinner-or-thicker relation among the line widths of the plurality of lines before executing the image processing; and     a setting unit that sets the line widths calculated by the calculation unit as the line widths of the plurality of lines after the image processing,     wherein the calculating unit calculates the line widths of the plurality of lines so as to maintain the number of types of line widths of the plurality of lines before executing the image processing, by increasing or reducing the line width of either one of the lines that will become the same line width by the image processing.

6. The image processing apparatus according to claim 5, wherein the image processing is a processing to reduce the image size or a processing to lower the resolution of the image in printing out the image.

7. The image processing apparatus according to claim 5, further comprising determining unit that determines whether or not the number of types of line widths of the plurality of lines contained in the image is reduced by executing the image processing,     wherein, when it is determined that the number of types of line widths is reduced by executing the image processing, the calculating and the setting are executed.

8. The image processing apparatus according to claim 5, wherein the calculating unit also calculates the line widths of the plurality of lines so as to maintain the line widths of the plurality of lines before executing the image processing, by an allotment processing which uses a line width of one of the plurality of lines processed by the image processing as a reference to perform allotment for line widths of other lines.

9. An image processing method of an image processing apparatus for performing image processing on an image defined by vector data containing a plurality of lines having different line widths, the method comprising:

implementing, by a calculation unit, a line width determination processing of calculating the line widths of the plurality of lines after executing the image processing so as to maintain the number of types of line widths of the plurality of lines and a thinner-or-thicker relation among the line widths of the plurality of lines before executing the image processing; and     setting, by a setting unit, the line widths calculated in the line width determination processing as the line widths of the plurality of lines after the image processing,     wherein the line widths of the plurality of lines are further calculated, by the calculation unit, so as to maintain the number of types of line widths of the plurality of lines before executing the image processing, by increasing or reducing the line width of either one of the lines that will become the same line width by the image processing.

10. The image processing method according to claim 9, wherein the image processing is a processing, by the setting unit, to reduce the image size or a processing to lower the resolution of the image in printing out the image.

11. The image processing method according to claim 9, further comprising determining, by the calculation unit, whether or not the number of types of line widths of the plurality of lines contained in the image is reduced by executing the image processing,     wherein, when it is determined that the number of types of line widths is reduced the calculation unit executes the line width determination processing.

12. The image processing method according to claim 9, wherein the line widths of the plurality of lines are further calculated, by the calculation unit, so as to maintain the line widths of the plurality of lines before executing the image processing, by an allotment processing which uses a line width of one of the plurality of lines processed by the image processing as a reference to perform allotment for line widths of other lines.

\* \* \* \* \*